United States Patent [19]

Gueret

[11] Patent Number: 5,360,978
[45] Date of Patent: Nov. 1, 1994

[54] MULTIPLE-TIP SCANNING TUNNELING MICROSCOPY

[75] Inventor: Pierre L. Gueret, Thalwil, Switzerland

[73] Assignee: International Business Machines Corporation, Armonk, N.Y.

[21] Appl. No.: 941,482

[22] Filed: Sep. 8, 1992

[30] Foreign Application Priority Data

Sep. 5, 1991 [EP] European Pat. Off. ........ 91810717.8

[51] Int. Cl.⁵ .............................................. H01J 37/26
[52] U.S. Cl. .................................. 250/306; 250/423 F
[58] Field of Search ................. 250/306, 307, 442.1, 250/423 F

[56] References Cited

U.S. PATENT DOCUMENTS

| | | | |
|---|---|---|---|
| 4,906,804 | 3/1990 | Zdeblick et al. | 250/442.1 |
| 4,998,016 | 3/1991 | Nose et al. | 250/306 |
| 5,182,724 | 6/1993 | Yanagisawa et al. | 369/126 |
| 5,270,543 | 12/1993 | Visser et al. | 250/306 |

Primary Examiner—Bruce C. Anderson
Attorney, Agent, or Firm—Ronald L. Drumheller

[57] ABSTRACT

The multiple STM-tip unit comprises a plurality of individually connectable, electrically separated tunnel tips (52...54) arranged in a common sandwiched block (5), in the form of a plurality of electrically conducting layers (41, 46, 50) each associated with at least one of said tunnel tips (52...54) with insulating layers (44, 48) intercalated between said conducting layers (41, 46, 50), the latter each having a contact pad (36, 42, 43) for connection to appertaining electronics. The thickness, area, and material characteristics of said insulating layers (44, 48) are chosen such that the tunnel current through any one of the intercalated insulating layers (44, 48) is negligible with respect to the tunnel current flowing across the gap between the involved tunnel tips (52...54) and the surface with which said tips cooperate.

8 Claims, 5 Drawing Sheets

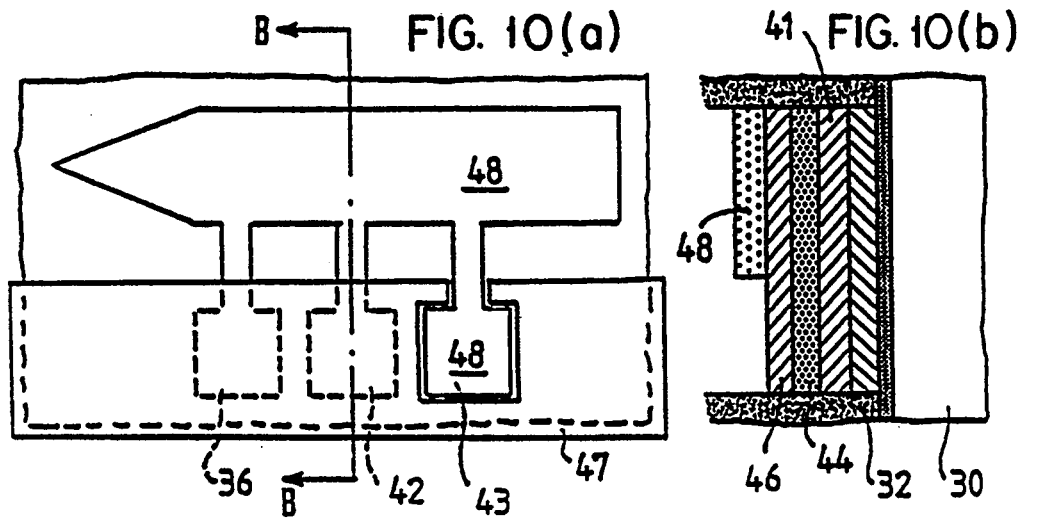
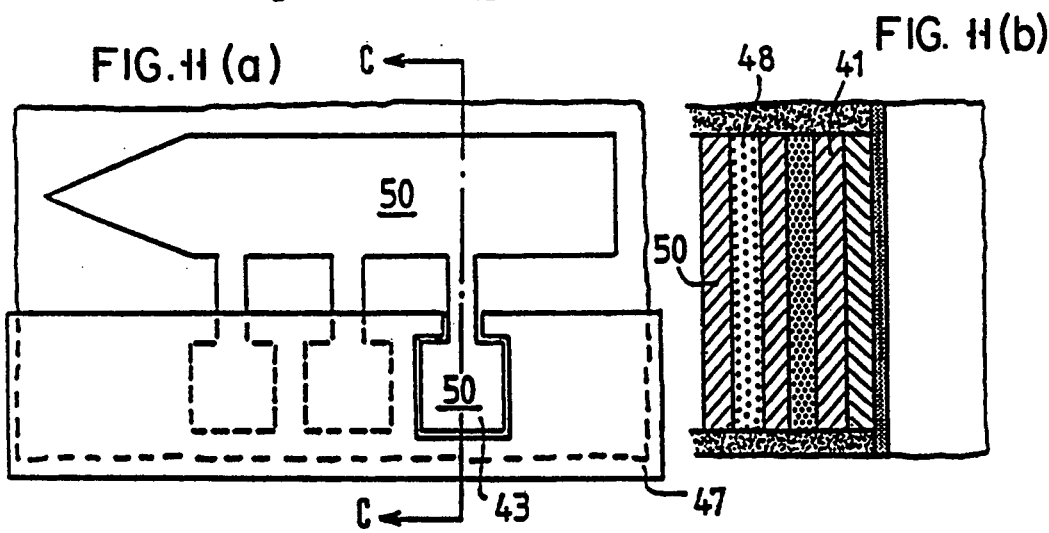
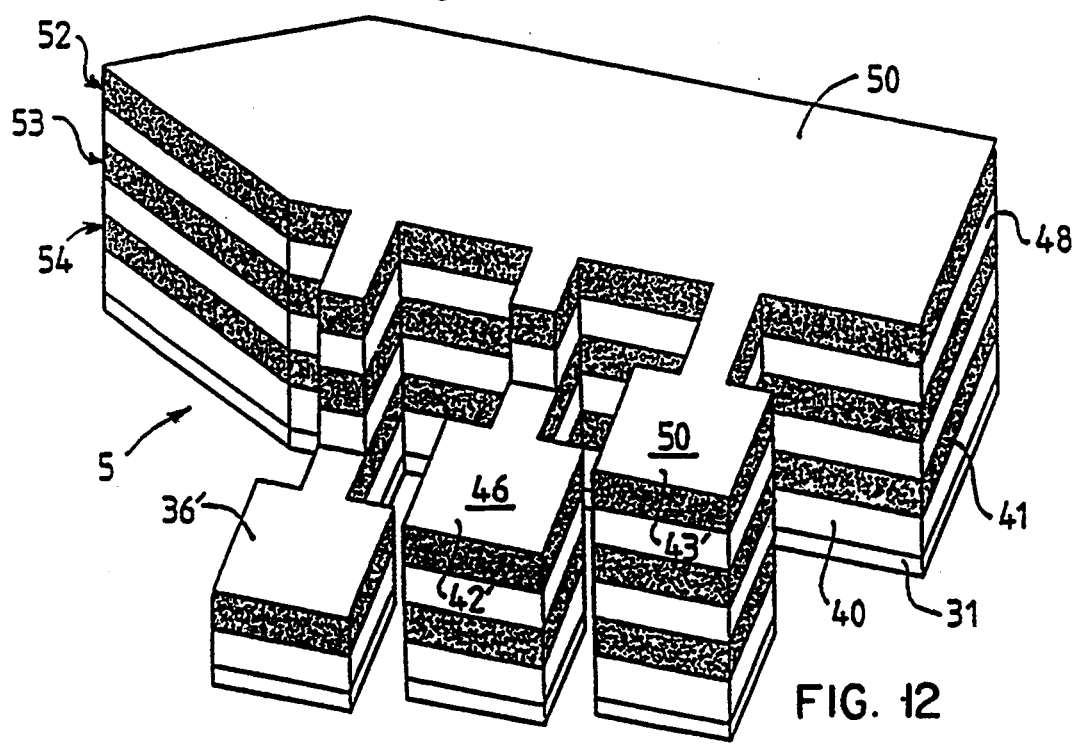

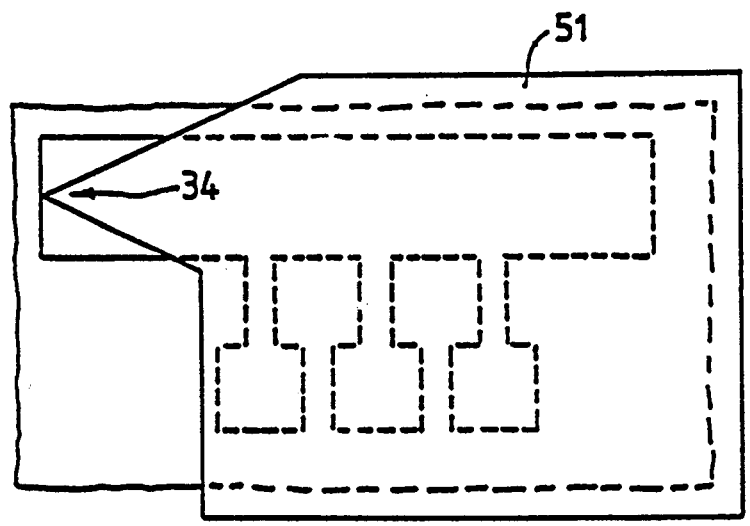
FIG. 13
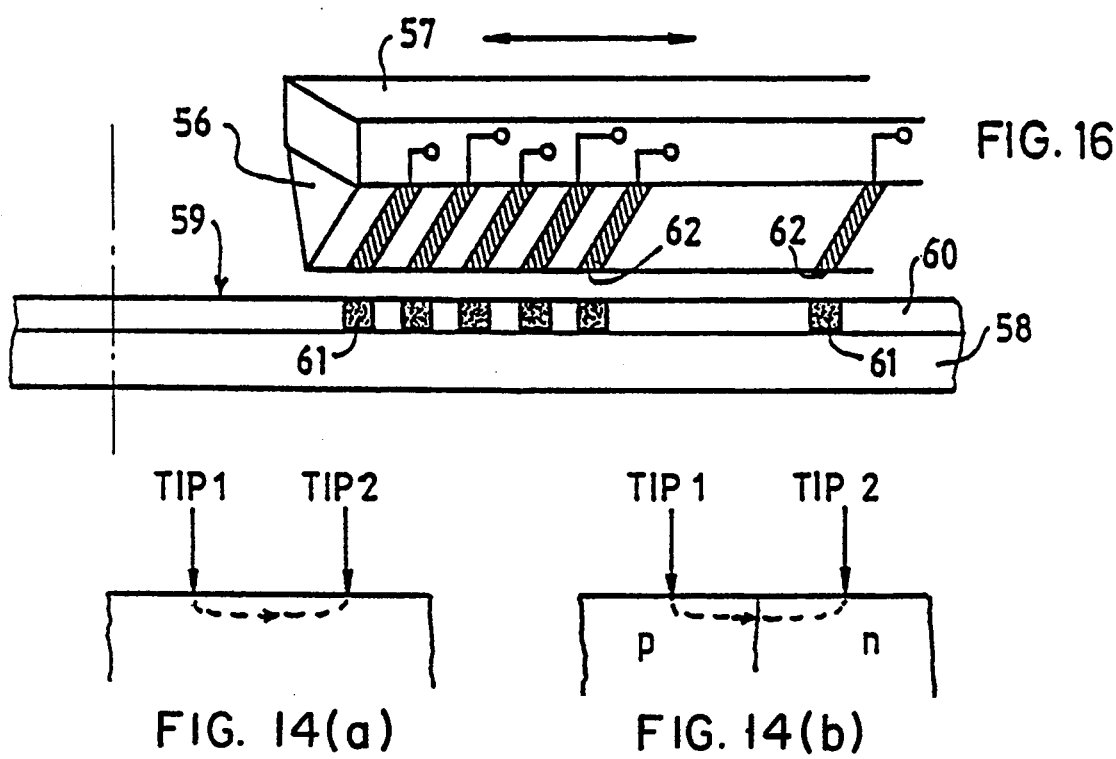
FIG. 16
FIG. 14(a)
FIG. 14(b)
FIG. 15(a)
FIG. 15(b)

MULTIPLE-TIP SCANNING TUNNELING MICROSCOPY

FIELD OF THE INVENTION

The subject invention broadly relates to scanning tunneling microscopy ("STM") and more particularly concerns scanning tunneling microscopy involving a multiple-tip assembly.

BACKGROUND ART

Single STM tips have been developed for use in scanning tunneling microscopy that consist of a thin wire, or whisker, ordinarily made of tungsten, which is sharpened at one end to a point. Ideally, the point carries only a single atom at its apex. Tips of this kind are described in H. W. Fink, "Mono-atomic tips for scanning tunneling microscopy," *IBJ J. Res. Dev,* Vol. 30, no. 5, pp. 460–465 September 1986.

A multiple-tip arrangement has been described in published European patent application A-O 194 323 in connection with a particular scanning tunneling microscope. Cantilever beams are formed by etching a planar silicon chip. The beams have six degrees of freedom to move under the control of electrostatic forces. Attached to each one of the cantilever beams is a tunnel tip which can interact with a defined part of a surface to be investigated.

A second multiple-tip arrangement is described in European patent application Ser. No. A-O 247 219 in connection with a distance-controlled transducer employed in a direct-access storage unit. Tips are individually attached to cantilever beams manufactured by etching from a common silicon body. Each of the cantilever beams, and hence each one of the tips, is individually adjustable by an electrostatic mechanism with respect to the surface of the storage medium of the storage unit.

A generally similar multiple-tip arrangement is shown in European patent application Ser. No. A-O 363 550 with an additional feature of having electronic circuitry for each of the tunnel tips integrated on the chip. The electronic circuitry enables the distance of the tips from the surface of an associated storage medium to be controlled.

European patent application Ser. No. A-O 382 192, which relates to a tunnel-current memory apparatus, discloses another arrangement with multiple tunnel tips. In the tunnel-current memory apparatus, a planar array of tunnel tips as well as a storage element are disposed on cantilevers which are driven by a piezoelectric mechanism.

SUMMARY OF THE INVENTION

I have invented a multiple STM-tip unit which comprises a plurality of individually connectable, electrically separated tunnel tips. The tunnel tips are formed as pointed portions of one or more sandwich structures. Each tunnel-tip sandwich structure comprises, in a common sandwiched block, a plurality of electrically conductive layers. Each of the tunnel tips is associated with at least one of the electrically conductive layers. Electrically insulating layers are intercalated between the conducting layers. Each of the conductive layers has a contact pad for connection to appertaining electronic circuitry. The thickness, area, and material characteristics of the insulating layers is chosen so that any tunnel current through an insulating layer which is intercalated between any two adjacent conducting layers is generally noninterferingly small relative to the tunnel current which flows across the gaps respectively between each of the two tunnel tips associated with the two conducting layers and the surface with which the tips interact.

A preferred multiple-tip unit for scanning tunneling microscopy comprises a plurality of tip-element laminae and one or more tip-separator laminae. Each tip-element lamina is composed of an electrically conductive material and each tip-separator lamina is composed of an electrically-insulative material. Each tip-element lamina of the preferred multiple-tip unit is shaped to form a tip point. A tip-location plane and a plurality of tip-element lamination planes are defined with respect to the multiple-tip unit. The tip-element lamination planes extend substantially parallel to one another in a spaced apart relationship. The tip-location plane extends substantially perpendicular to the tip-element lamination planes. A laminated structure is formed with the tip-element laminae extending within the tip-element lamination planes with pairs of tip-element laminae in adjacent tip-element lamination planes extending in a face-to-face relationship with a tip-separator lamina extending between each pair. The tip points of the preferred multiple-tip unit are located substantially within the tip-location plane. Each tip-element lamina has an electrical contact area defined on it for making an electrical connection to it. The face-to-face area of each pair of adjacent tip-element laminae in the preferred multiple-tip unit is sufficiently small and the thickness of the tip-separator lamina extending between the pair being sufficiently great so that in scanning-tunneling-microscopy operation, any tunneling current which flows through the tip-separator lamina from one tip-element lamina of the pair to the other is noninterferingly small relative to tunneling currents which flow from the tip points of the two tip-element laminae of the pair to the surface under scanning-tunneling-microscopy interaction.

In one preferred multiple-tip unit of the invention, the tip points are disposed in the tip-location plane essentially in a single line. In another preferred multiple-tip unit of the invention, the tip points are disposed in the tip-location plane in an array of two essentially parallel lines.

The electrically conductive tip-element laminae may be made of a metal, a semiconductor or a high-$T_c$ superconductor. Preferably the electrically conductive laminae are made of tungsten or gold, with tungsten being particularly preferred.

Preferably, the electrically insulating tip-separator laminae are composed of strontium titanate $SrTiO_3$ or silicon dioxide $SiO_2$, with strontium titanate being particularly preferred.

The subject invention also relates to a method for manufacturing a multiple-tip unit of the kind described above. The method of the invention comprises the step of providing a substrate coated with a layer of a soluble adhesive and a layer of photoresist on top of the soluble adhesive layer. The method also includes the step of providing at least one mold opening in the photoresist layer of a size and a shape to accommodate the desired multiple-tip unit structure. A first insulating layer is deposited in the mold opening to cover essentially the entire bottom area of the mold opening. A first electrically conducting layer is deposited on top of the insulating layer, optionally using a first shadow mask. The mold opening, optionally in cooperation with the first shadow mask, defines the shape of the first conducting layer to include a first contact area. A second insulting layer is deposited through said mold opening using a second shadow mask having a second pattern opening which, in cooperation with the mold opening, defines the shape of the second insulating layer and which covers the first contact area so that the second insulating layer does not extend over the first contact area. A second conducting layer is deposited on top of said second insulating layer, using the second shadow mask. Any further insulating layers and conducting layers as the design of the multiple-tip unit may require are deposited using any further masks as appropriate. The method of the invention includes the step of dissolving the photoresist. The method also includes the step of detaching the resulting structure from the substrate by dissolving the soluble adhesive.

BRIEF DESCRIPTION OF THE DRAWINGS

Details of preferred multiple-tip units of the invention and of preferred methods for manufacturing multiple-tip units will be described below by way of example and with reference to the following drawings.

FIG. 12 is a perspective view of a three-tip structure of FIG. 11.

FIG. 13 illustrates an alternative manufacturing process step.

FIG. 14(a–b) schematically shows the use of a two-tip unit in surface transport studies.

FIG. 15(a–b) schematically shows the use of a multiple-tip unit in connection with studies on field-effect devices.

FIG. 16 is a schematic representation of a disk storage unit employing a multiple-tip read/write head.

BEST AND PREFERRED MODES FOR CARRYING OUT THE INVENTION

Figure 1:
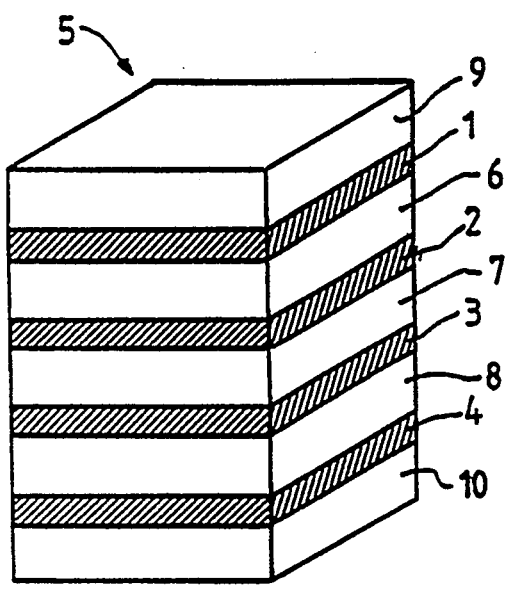
FIG. 1 is a simplified oblique view of a preferred multiple-tip head in accordance with the invention to illustrate a basic concept of the invention.

A basic concept of the multiple-tip unit of the present invention is shown in FIG. 1, where four layers 1, 2, 3, 4 of tungsten or other electrically-conducting material (including metals, semiconductors and high-$T_c$ superconductors) are arranged in a common block 5, with three layers 6, 7, 8 of strontium titanate or other electrically insulating material intercalated between them. Additional insulating layers 9 and 10 may be deposited to protect the uppermost and lowermost conducting layers 1 and 4, respectively. For stability, manufacture is preferably started with a thick insulating layer 10 which can serve as a substrate.

The thickness of the insulating layers 6, 7, 8 between adjacent conducting layers 1, 2, 3, 4 is preferably sufficiently great that the tunneling current across the insulating layers 6, 7, 8 is generally negligible compared to the tunneling current flowing across the gap between any one of the tips 11, 12, 13, 14 and the surface with which the tip interacts. A thickness $t_M$ of the metal conducting layer of about 1 nm and a thickness of the oxide insulating layer $t_{ox}$ in the range of roughly 2 to 3 nm is generally suitable for preferred applications. The successive stacking of the various conducting layers 1–4 and insulating layers 6–10, respectively, by evaporation and oxide sputtering, for example, allows a precise control of the thickness $t_M$ and $t_{ox}$ of these layers.

Figure 2:
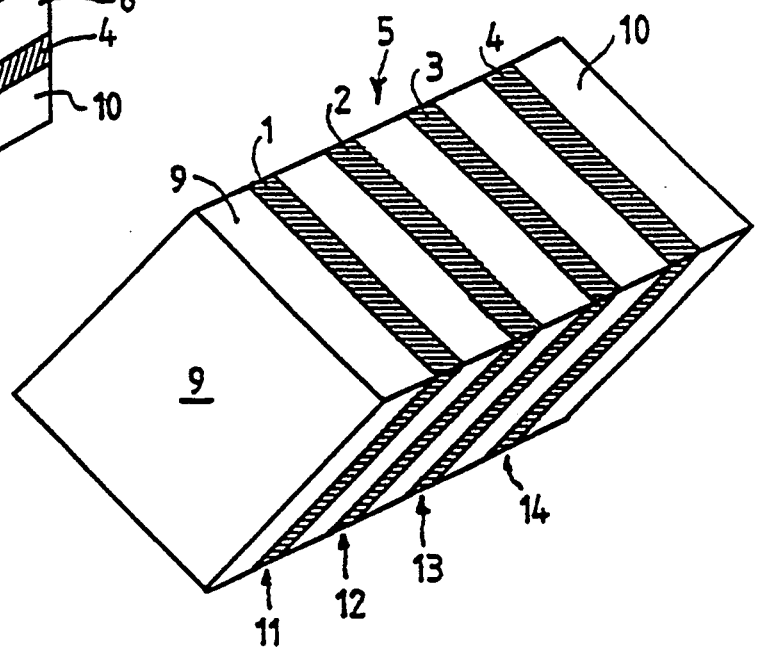
FIG. 2 shows the multiple-tip head of FIG. 1 in a tilted orientation.

FIG. 2 shows the block 5 of FIG. 1 tilted over so that the top insulating layer 9 becomes the front of block 5 facing the viewer. The four corners of conducting layers 1, 2, 3, 4 which point downwards in FIG. 2 serve as tunnel tips 11, 12, 13, 14. Using high-resolution electron-beam lithographic techniques for cutting block 5, corners with a radius of 10 nm or even less can be obtained. For highest resolution, it is preferable for the corners to terminate effectively in a single atom, although single-atom termination is not required for many applications of scanning-tunneling microscopy. The sandwich structure of block 5 permits each of the four tips 11, 12, 13, 14 to be connected individually to the control circuitry by making electrical contact with the conducting layers 1, 2, 3, 4.

Figure 3:
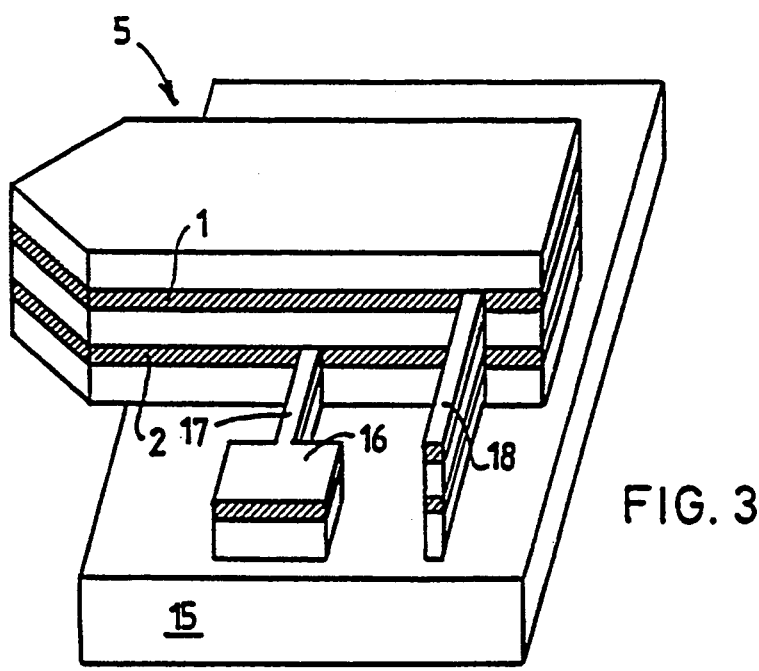
FIG. 3 is a partial perspective view of a preferred two-tip unit of the invention.

Turning now to FIG. 3, a two-tip unit 105 is shown after cutting to a desired dimension mounted to a support platform 15 for easy handling. The sandwiched structure of a multiple-tip unit in accordance with the invention permits electrical contact to the individual tips to be made by contact pads, such as contact pad 16. The contact pads are arranged on the support platform 15 and connected to the conducting layers 1, 2 by a bridge 17, 18. A contact pad for bridge 18 is not shown in FIG. 3 for clarity.

Figure 4:
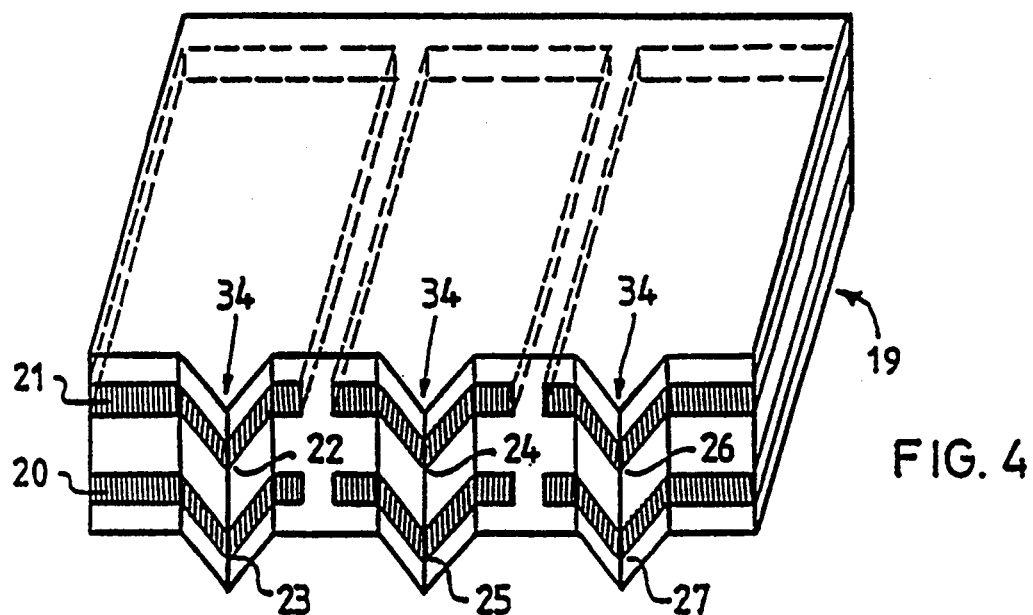
FIG. 4 depicts a preferred multiple-tip head having three rows of pairs of tips.

FIG. 4 shows an arrangement with three rows 34 of twin tips 22, 23; 24, 25; 26, 27 in an array cut from a common sandwich block 19. The sandwich block 19 has conducting layers 20 and 21 which, as shown in FIG. 4, are interrupted by gaps inside block 19 to allow each of the tips 22 . . . 27 to be connected individually to control circuitry.

The following calculation concerns dimensional requirements involved in the design of a multiple tip unit in accordance with the invention. The tip-to-sample tunnel conductance $G_T$ is on the order of $$G_T \approx G_O T_T \qquad [1]$$

whereas the tunnel conductance through the insulator, $G_{ox}$, is on the order of $$G_{ox} \approx (A/\lambda_F^2) \cdot G_0 \cdot T_{ox} \qquad [2]$$

where $G_0 = q^2/\pi h$, $q = e$ is the charge of the electron, A is the conductor or insulator area, $\lambda_F$ is the Fermi wavelength in the conductor, and $T_T$ and $T_{ox}$ are respectively the tunneling transmission coefficients of the tunnel gap and of the insulator material. A suitable design requires that $$\frac{G_T}{G_{ox}} = \frac{T_T}{(A/\lambda_F^2)T_{ox}} >> 1 \qquad [3]$$

Under the assumption that the tip/surface distance is not larger than the thickness $t_M$ of the metal conducting layer and that the vacuum and insulator barriers $\Phi$ are the same and equal to about 4 eV, and that the tunneling transmission coefficient of the insulator material $T_{ox}$ is given approximately by $T_{ox} = e^{-a\sqrt{\Phi} t_{ox}}$, where $t_{ox}$ is the thickness of the insulating oxide layer and the proportionality factor "a" is given approximately by $a = 11.3$ nm$^{-1}$(eV)$^{-\frac{1}{2}}$, equation [3] yields approximately:

$$(A/\lambda_F^2) << e^{2(t_{ox} - t_M)}. \quad [4]$$

With $\lambda_F \approx 3 \times 10^{-8}$ cm, $t_{ox} = 3$ nm, $t_M = 1$ nm, equation [4] yields for the insulator area: $A << 150 \times 150$ cm$^2$. Thus, for example, the insulator area A can be about 1 cm$^2$. The lateral size of a unit block can thus be fairly large and suitable for handling.

In the following, two preferred methods for manufacturing the multiple-tip unit in accordance with the invention will be described. While only the most significant steps shall be explained, it will be obvious to those skilled in the art that various additional rinsing, cleaning, registering, testing, and other conventional steps are required in the manufacture of the multiple-tip units of the invention.

The following description will refer to FIGS. 5 through 11 in which (a) indicates a top plan view and (b) indicates a cross-sectional view along the lines A—A through C—C in the respective (a)-part of the figure.

Figure 5A:
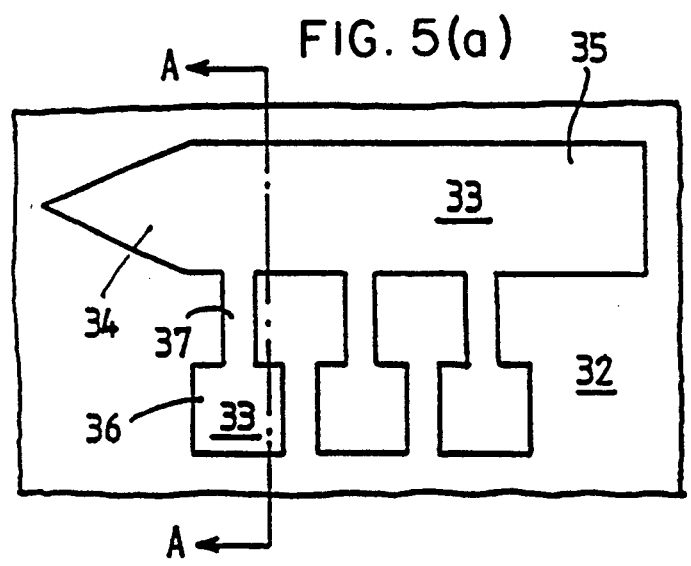
FIGS. 5(a–b) to 11(a–b) respectively show top-plan views and cross-sectional views of a preferred three-tip ATM head at various stages of manufacture in accordance with a preferred method of the invention.
Figure 5B:
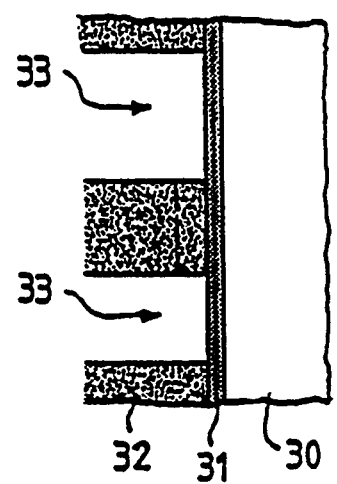
Figure 6A:
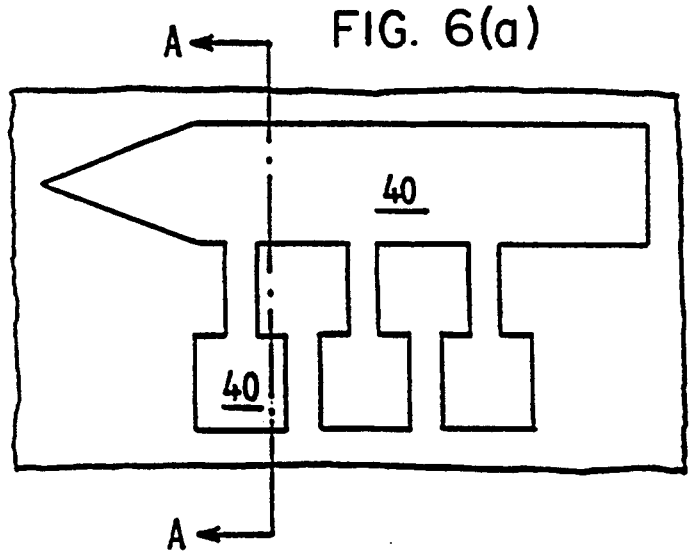
Figure 6B:
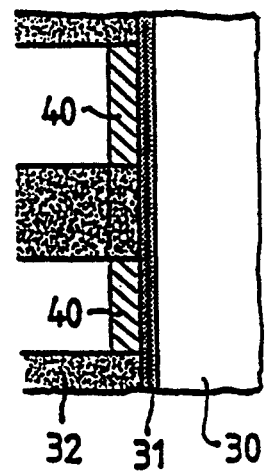
Figure 7A:
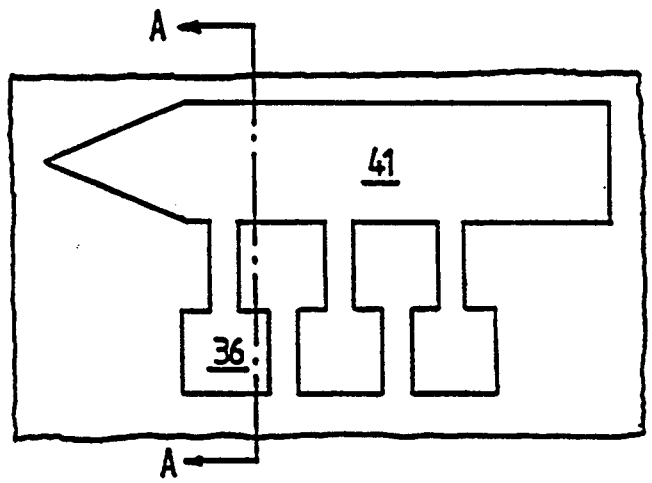
Figure 7B:
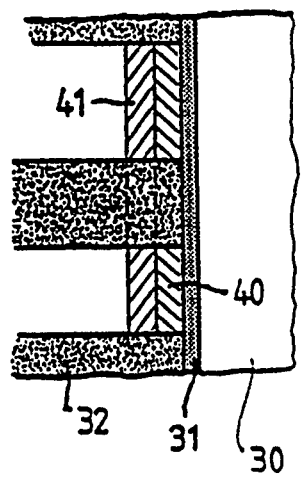
Figure 8A:
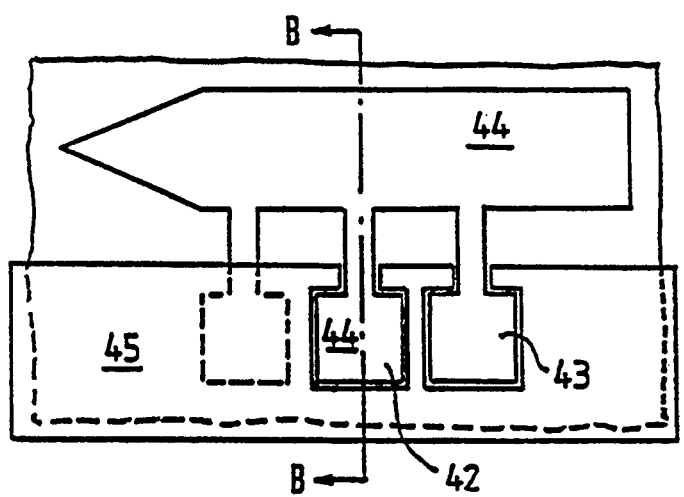
Figure 8B:
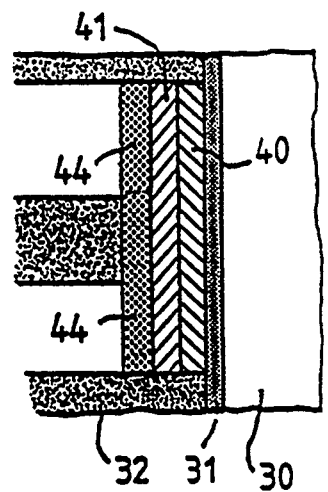
Figure 9A:
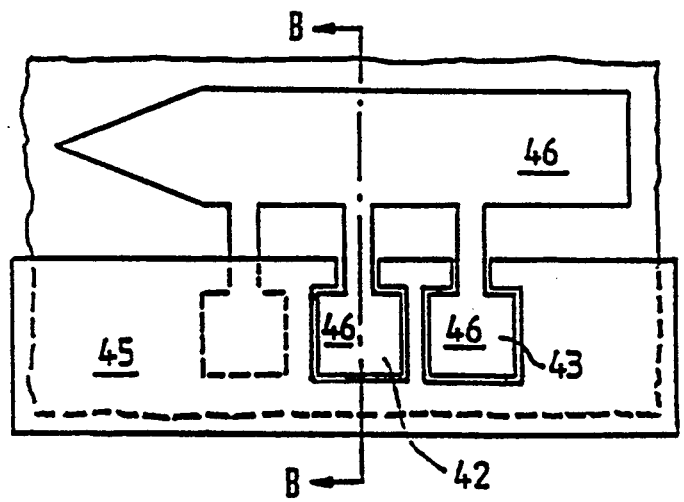
Figure 9B:
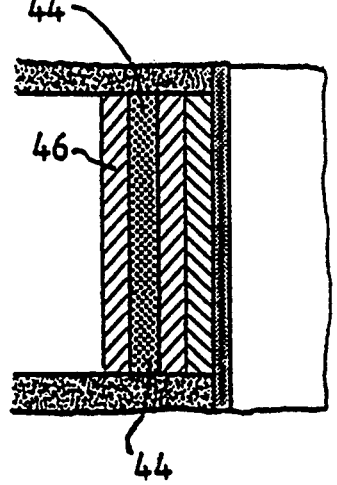

Method 1:

1. To make a three-tip STM head as illustrated in FIG. 12, a substrate 30 of a size convenient to handle is covered with a layer of a soluble adhesive 31 as shown in FIG. 5. A conventional negative resist can serve as the adhesive, provided that it remains adherent throughout subsequent photolithography steps. The soluble adhesive will allow the multiple-tip structure to be detached from the substrate 30 after fabrication is completed. The adhesive-coated substrate 30/31 is then coated with a layer of electron-beam-sensitive poly)methylmethacrylate) ("PMMA") photoresist 32. The thickness of the photoresist 32 is at least equal to the sum of all thicknesses of the conducting and insulating layers to be subsequently deposited.
2. Photoresist 32 is illuminated with a high-resolution e-beam and developed so as to open a mold opening 33 therein with a shape as shown in FIG. 5 for a three-tip unit. The shape of the mold opening 33 serves to define a pointed portion 34 which is later to become the multiple tip, an elongated body portion 35, and three contact pad wells, 36, 42, 43 attaching to body portion 35 through three corresponding bridge slots 37, 38, 39,
3. A first insulator layer 40 is then deposited by sputtering through the mold opening 33, covering the entire bottom thereof as shown in FIG. 6.
4. Still through the same mold opening 33, a first metal conducting layer 41 is deposited by evaporation on top of first insulator layer 40, as shown in FIG. 7(a). The entire first insulator layer, including that in the bottom of the three pad wells 36, 42, 43, is covered with the metal conductor.
5. A second insulator layer 44 is deposited through mold opening 33 by sputtering, using a first mask 45 to cover the first pad well 36, but leaving pad wells 42 and 43 uncovered, as shown in FIG. 8.
6. Still through the first mask 45, a second conducting layer 46 is evaporated covering the entire second insulator layer in the body portion 34/35 and the second and third pad wells 42 and 43 with their bridge slots 38 and 39, as shown in FIG. 9.
7. Using a second mask 47 which covers the first pad well 36 and the second pad well 42, a third insulator layer 48 is sputtered as shown in FIG. 10. The third insulator layer covers so much of the second conducting layer as lies within the body portion 34, 35 of the mold cavity and the third contact pad well 43, as may be seen in FIG. 10.
8. Still through the third mask 47, a third conducting layer 50 is evaporated covering the third insulator layer now forming the floor of the entire body portion and the third pad well 43 with its bridge slot 39 to form the third tip and its associated contact pad 43', as may be seen in FIG. 11.
9. The photoresist 32 is then dissolved and lifted off. FIG. 12 is a photoresist view of the resulting structure with the photoresist removed.
10. The structure is then detached from the substrate by dissolving the adhesive 31.
11. Finally, the structure is coated with a protective layer (not shown) and attached to an appropriate holder, leaving the tip zone free for interaction. Electrical connections are made to the pads 36', 42' and 43'.

Method 2:

1. The first eight steps 1 to 8 of Method 1 are performed except that the mold opening is shaped to provide a substantially rectangular recess for body portion 35 instead of providing a corner for the pointed portion 34, as may be seen in FIG. 13.
2. Cover the resulting structure with a photoresist and illuminate with an e-beam outside the area 51 as shown by the continuous line in FIG. 13. The photoresist is then developed to expose the area outside the area 51.
3. Dry-etch the exposed portion not covered with photoresist to define a pointed portion 34 containing the tips 52 . . . 54.
4. Perform the three final steps 9 to 11 of Method 1.

Examples of applications of preferred multiple-tip units of the invention are set forth below.

Two tips with a mutual distance in the order of about 3 nm can be used for transport measurements between two neighboring regions on the surface of a sample under investigation, as shown in FIG. 14(a).

A twin-tip arrangement is suitable for the study of local transport phenomena across interfaces such as heterostructures, grain boundaries, or p-n junctions, as shown in FIG. 14(b).

Local topography/spectroscopy combined with surface transport investigations can be studied with the multiple-tip apparatus of the invention.

Surface electromigration can be studied with preferred embodiments of the invention.

Extremely miniaturized planar devices, such as certain field effect transistors ("FETs"), can be observed with preferred embodiments of the invention. In a three-tip arrangement as shown in FIG. 15(a), current flowing between a source (S) contact and a drain (D) contact modifies the equilibrium electronic distribution at the sample surface along the path S-D. The intermediate tip (G) can then be used as a probe to measure the change induced by the current along S-D. In turn, the structure of FIG. 15(a) can be viewed as an extremely miniaturized three-terminal FET-like device. The structure of FIG. 15(b) is a generalization of the three-tip arrangement of FIG. 15(a) and can be used to probe electronic distributions at several points ($G_1, G_2, \ldots$) when a current is flowing along a current channel between the S and D contacts of an FET.

A preferred multiple-tip unit of the present invention can be used in an arrangement similar to conventional magnetic disk memories for reading and writing of digital information in a high-density memory. Memory devices employing conventional STM heads are described in U.S. Pat. No. 4,575,822 to Quate and in an article published in *IEEE Transactions on Electronic Devices*, vol. ED-28, pp. 854ff (1981), which may be consulted for information concerning operation of such devices.

FIG. 16 shows an arrangement in which a multiple-tip unit 56 is attached to a read/write head 57 which is supported for movement parallel to the surfaced of a rotating disk 58. The surface 59 of the disk carries a coating 60 which is capable of storing digital information in response to tunnel currents flowing between any one of the tips 62 and the surface 59.

The multiple-tip unit 56 can simultaneously cooperate for reading/writing information with as many tracks on the memory disk 58 as it has tunnel tips 62. The maximum number of tips depends on the ability to manufacture uniform disk surfaces and tip units, considering that the multiple-tip unit of the invention has nanometer dimensions.

To avoid crashing of head 57 into the surface 59 of disk 58, all large-scale excursions of head 57 are performed at sufficiently large distance between head unit 57 and disk surface 59. Fine approach to within tunneling-interaction distance, i.e. in the nanometer range, for reading and writing information, is made by controlling the tunnel current across the gap between the tips 62 and the surface 59 of the storage disk 58, much the same as it is done in scanning tunneling microscopy.

The bit resolution on any one of the tracks is expected to be comparable to STM resolution, i.e. on the order of about 1 nm. The minimum distance between the tracks is determined by the multiple-tip unit, and is on the order of about 10 nm. This would yield a bit density of about $10^{13}$ bits/cm$^2$.

A ten-tip unit has an overall length of about 0.1 μm. For this size, manufacturing processes currently available are expected to yield sufficient uniformity of the units. It is expected that wafers grown epitaxially would provide storage disks 58 with the required flatness.

It is not intended to limit the present invention to the specific embodiments described above. For example, the various conducting layers of a multiple-tip head of the invention may be made of different materials and have different thicknesses, if desired. The various insulating layers intercalated between the conducting layers may be made of different materials and have different thicknesses, if desired. It is recognized that these and other changes may be made in the devices and processes specifically described herein without departing from the scope and teaching of the instant invention, and it is intended to encompass all other embodiments, alternatives, and modifications consistent with the invention.

I claim:

1. Multiple STM-tip unit comprising a plurality of individually connectable, electrically separated tunnel tips CHARACTERIZED in that the tunnel tips are designed as pointed portions (34) of sandwich structures comprising, in a common sandwiched block (5, 19), a plurality of conducting layers (1 . . . 4; 20, 21; 41, 46, 50) each associated with at least one of said tunnel tips (11 . . . 14; 22 . . . 27; 52 . . . 54) with insulating layers (6 . . . 8; 40, 44, 48) intercalated between said conducting layers (1 . . . 4; 20, 21; 41, 46, 50), the latter each having a contact pad (16; 36, 43, 49) for connection to appertaining electronics, the thickness, area and material characteristics of said insulating layers (6 . . . 8; 40, 44, 48) being chosen such that the tunnel current through an insulating layer (6, 7, 8; 44, 48) which is intercalated between any two adjacent conducting layers (1, 2; 2, 3; 3, 4; 20, 21; 41, 46; 46, 50) is negligible with respect to the tunnel current flowing across the gap between each of the two respectively involved tunnel tips (11 . . . 14; 22 . . . 27; 52 . . . 54) and the surface with which said tips (11 . . . 14; 22 . . . 27; 52 . . . 54) cooperate.

2. Multiple-tip unit in accordance with claim 1, CHARACTERIZED in that said common sandwiched block (19) is designed to have two or more pointed portions (34) and that each of the conducting layers (20, 21) consists of a number of electrically separate portions, such that each of the tops (22 . . . 27) formed at one of said plurality of pointed portions (34) of the unit is individually connectable electrically.

3. Multiple-tip unit in accordance with claim 1, for employment in a rotating disk storage device, CHARACTERIZED in that said common sandwiched block (56) is attached to a read/write head (57) radially movable with respect to a rotatable disk (58) carrying, on its surface (59) a coating (60) capable of storing digital information in discrete storage locations (61) arranged along circular tracks on said disk (58), and that said tunnel tips (62) are positionable for cooperation with said storage information for the reading and/or writing of bits of information.

4. A multiple-tip unit for scanning tunneling microscopy comprising a plurality of tip-element laminae and one or more tip-separator laminae, each tip-element lamina being composed of an electrically conductive material, each tip-separator lamina being composed of an electrically-insulative material, each tip-element lamina being shaped to form a tip point, a tip-location plane and a plurality of tip-element lamination planes being defined with respect to the multiple-tip unit, the tip-element lamination planes extending substantially parallel to one another in a spaced apart relationship, the tip-location plane extending substantially perpendicular to the tip-element lamination planes, the tip-element laminae extending within the tip-element lamination planes with pairs of tip-element laminae in adjacent tip-element lamination planes extending in a face-to-face relationship with a tip-separator lamina extending between each pair to form a laminated structure, the tip points being located substantially within the tip-location plane, each tip-element lamina having an electrical contact area defined on it for making an electrical connection to the tip-element lamina, the face-to-face area of each pair of adjacent tip-element laminae begin sufficiently small and the thickness of the tip-separator lamina extending between the pair being sufficiently great so that in scanning-tunneling-microscopy operation, any tunneling current which flows through the tip-separator lamina from one tip-element lamina of the pair to the other is noninterferingly small relative to tunneling currents which flow from the tip points of the two tip-element laminae of the pair to the surface under scanning-tunneling-microscopy interaction.

5. The multiple-tip unit of claim 4 in which the tip points are disposed in the tip-location plane essentially in a single line.

6. The multiple-tip unit of claim 4 in which the tip points are disposed in the tip-location plane in an array of two essentially parallel lines.

7. The multiple-tip unit of claim 4 in which the tip-element laminae are composed of tungsten or gold.

8. The multiple-tip unit of claim 4 in which the tip-separator laminae are composed of strontium titanate or silicon dioxide.

* * * * *